(No Model.)
J. B. A. GRENIER.
WHEELBARROW.
No. 528,251.  Patented Oct. 30, 1894.
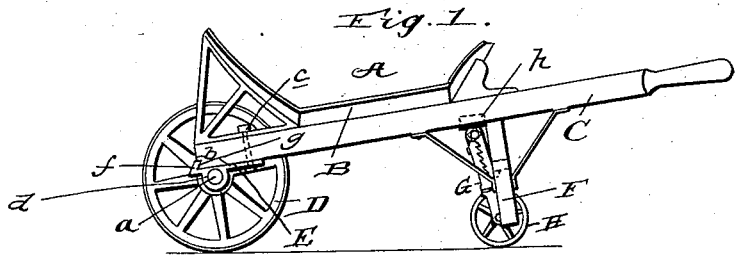
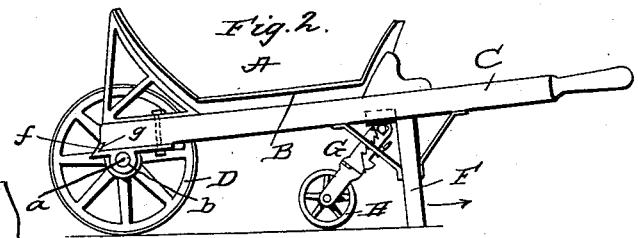
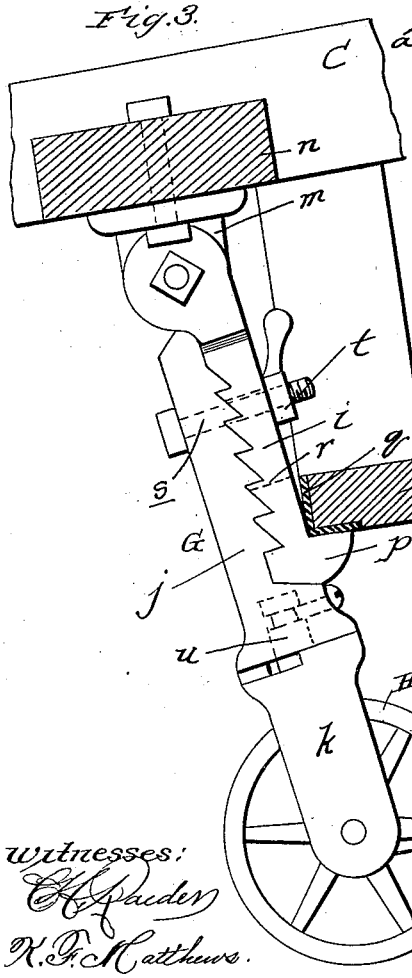
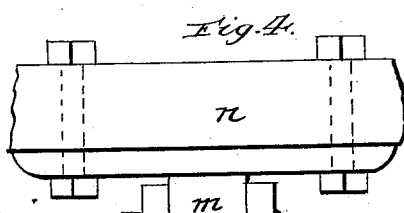
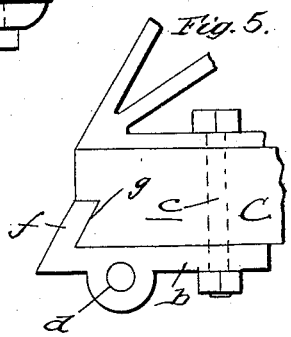
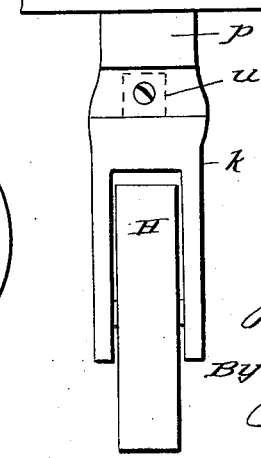
Witnesses:
Inventor
J. B. A. Grenier
By James J. Sheehy
Attorney
THE NORRIS PETERS CO., PHOTO-LITHO., WASHINGTON, D. C.

UNITED STATES PATENT OFFICE.

JANE B. ALFRED GRENIER, OF WOONSOCKET, RHODE ISLAND.

WHEELBARROW.

SPECIFICATION forming part of Letters Patent No. 528,251, dated October 30, 1894.

Application filed July 9, 1894. Serial No. 516,990. (No model.)

*To all whom it may concern:*

Be it known that I, JANE B. ALFRED GRENIER, a citizen of the United States, residing at Woonsocket, in the county of Providence and State of Rhode Island, have invented certain new and useful Improvements in Wheelbarrows; and I do declare the following to be a full, clear, and exact description of the invention, such as will enable others skilled in the art to which it appertains to make and use the same.

My invention relates to improvements in wheel barrows; and its novelty will be fully understood from the following description and claims when taken in connection with the accompanying drawings, in which—

Figure 1, is a side elevation of a wheel barrow embodying my invention; the auxiliary wheel being shown in its operative position. Fig. 2, is a similar view with the auxiliary wheel in the position it assumes when the barrow is drawn rearwardly or in the direction indicated by arrow. Fig. 3, is an enlarged detail section of the barrow illustrating the auxiliary wheel and its appurtenances and the parts of the barrow adjacent to the same. Fig. 4, is a rear elevation of the same. Fig. 5, is a detail section illustrating one of the bearings of the axle or shaft of the main wheel, and the manner in which it is connected to the handle bar of the barrow, and Fig. 6, is a detail front elevation of the same.

Referring by letter to said drawings:—A, indicates a wheel barrow having the usual body B, and frame or handle bars C; and D, indicates the main wheel of the barrow which has its axle or shaft $a$, journaled in the bearings E, connected to the handle bars C. The said bearings E, are respectively cast or otherwise formed in one piece and they respectively comprise the body plate $b$, which has a vertical aperture to receive the connecting bolt $c$, and a lateral aperture $d$, to receive the wheel axle or shaft, and the forward, upwardly and rearwardly extending branch $f$. These branches $f$, of the bearings E, when arranged in the notches $g$, in the ends of the handle bars, tend to prevent movement of the bearings in a rearward direction and also in a downward direction and thereby render a single bolt as $c$, or the like capable of securely holding each bearing in position.

F, indicates the legs of my improved wheel barrow which are preferably connected to the handle bars C, at the rear end of the body and are connected and braced by a cross bar as $h$; and G, indicates the arm carrying the auxiliary wheel H. This arm G, preferably comprises three sections $i, j$, and $k$, and it has its upper section $i$, pivotally connected with a lug $m$, in a cross bar $n$, of the handle bars, so that it can swing in a longitudinal direction, and also has said section $i$, provided on its rear side with a projection $p$, to engage the cross bar $h$, of the legs, which is preferably provided with a reinforce plate $q$, as shown to prevent wear. The sections $i, j$, of the arm G, have their contiguous sides toothed as better shown in Fig. 3, and the section $i$, has a longitudinal slot $r$, for the passage of the connecting bolt $s$, which is secured in position by the nut $t$, as illustrated. This manner of connecting the sections $i, j$, admits of them being adjusted with respect to each other to increase or diminish the length of the arm G, as desirable; it being simply necessary in order to change the length of the arm to loosen the nut, adjust the sections to the proper or desired position and then tighten the nut up again. The lower section $k$, of the arm G, which carries the wheel H, is preferably connected to the section $j$, in a swiveled manner, so as to enable the wheel H, to make about a quarter turn and thereby assist the pusher in guiding the barrow. This connection of the section $k$, to the section $j$, is preferably effected by forming the meeting ends of the sections in such a manner that the section $k$, can only make about a quarter turn, and providing the said section $k$, with a reduced circular portion $u$, which is designed to take into a corresponding socket in the section $j$, and is provided with a circumferential groove designed to receive a securing pin or screw, better shown in Fig. 3.

I prefer in practice to make the arm G, of my improved barrow in three pieces for the reasons above stated, but I do not desire to be understood as confining myself to such construction as the arm might be formed in two pieces if desired.

By reason of the arm G, being pivotally or otherwise loosely connected with the barrow, as described, it will be seen that when the barrow is raised by its handle bars and pushed forwardly, the arm will swing rearwardly into the position shown in Figs. 1, and 3, and bear against the cross bar $h$, of the legs and will support the rear portion of the barrow, thus rendering the task of pushing the same much easier. It will also be seen that when it is desired to rest the barrow on its legs F, it is simply necessary to draw the same rearwardly a slight distance when the arm G, will assume the position shown in Fig. 2, and let the legs drop to the ground. From the position shown in said figure, the arm G, will be moved to the position shown in Fig. 1, by simply pushing the barrow forwardly as above described; and by such movement it will be noticed that the said arm will raise the rear end of the barrow, thus sparing the laborer the strain and exertion incidental to such operation.

Having described my invention, what I claim is—

1. In a wheel barrow, the combination of a frame having the notches $g$, in its end, a wheel C, having an axle or shaft, the bearings E, having apertures to receive the axle and comprising the body plates $b$, resting under the frame and the forward, upwardly and rearwardly extending branches $f$, engaging the notches $g$, in the frame, and bolts taking through the frame and the body plates of the bearings, substantially as and for the purpose set forth.

2. In a wheel barrow, the combination with a frame having the depending legs provided with a cross bar; of the depending arm G, carrying the wheel H, and comprising the section $i$, pivotally connected with the frame and having one of its sides toothed and also having a longitudinal slot, the section $j$, having a toothed side to engage that of the section $i$, a bolt taking through the section $j$, and the slot of the section $i$, and a nut mounted on said bolt, substantially as specified.

3. In a wheel barrow, the combination with a frame having the depending legs provided with a cross bar; of the depending arm G, comprising the section I, pivotally connected with the frame and having one of its sides toothed and also having a longitudinal slot, the section $j$, having a toothed side to engage that of the section $i$, a bolt taking through the section $i$, and having a nut mounted thereon, and the lower section $k$, carrying the wheel H, and having the reduced circumferentially-grooved, circular portion $u$, designed to rest and turn in a corresponding socket in the section $j$; the meeting ends of said sections $j$, $k$, being so formed as to prevent the section $k$, from making a full turn, substantially as and for the purpose set forth.

In testimony whereof I affix my signature in presence of two witnesses.

JANE B. ALFRED GRENIER.

Witnesses:
E. LE ROY SPAULDING,
GEO. W. SPAULDING.